United States Patent [19]

Herledan et al.

[11] 4,339,815
[45] Jul. 13, 1982

[54] MULTIPLEX CONNECTION UNIT FOR USE IN A TIME-DIVISION EXCHANGE

[75] Inventors: Jean-René Herledan, Lannion; Bernard Le Dieu, Perros Guirec; Jean-Pierre Martin, Pleumeur Bodou; Daniel Quemere, Perros Guirec, all of France

[73] Assignee: Compagnie Industrielle des Telecommunications Cit-Alcatel, Paris, France

[21] Appl. No.: 146,985

[22] Filed: May 5, 1980

[30] Foreign Application Priority Data

May 4, 1979 [FR] France .................................. 79 11320

[51] Int. Cl.³ .......................................... H04Q 11/04
[52] U.S. Cl. ..................................................... 370/58
[58] Field of Search ............................. 370/56, 58, 53

[56] References Cited

U.S. PATENT DOCUMENTS 3,735,049  5/1973  Buchner et al. ...................... 370/58
3,801,746  4/1974  Buchner .............................. 370/58
3,889,067  6/1975  Reed et al. .......................... 370/58

Primary Examiner—Joseph A. Orsino, Jr.
Attorney, Agent, or Firm—Sughrue, Mion, Zinn, Macpeak & Seas

[57] ABSTRACT

A multiplex connection unit for use in a time-division exchange comprising identical connection modules and a control interface connected to the control units of the exchange. A module comprises transcoders, synchronizing units (one per transcoder), a traffic distributor connected to the switching network, a signalling receiver and a signalling sender connected to the traffic distributor and to the control interface.

6 Claims, 11 Drawing Figures

MULTIPLEX CONNECTION UNIT FOR USE IN A TIME-DIVISION EXCHANGE

BACKGROUND OF THE INVENTION

The invention concerns the connection of multiplexes lines connecting a time-division exchange to other time-division or electromechanical exchanges or to line concentrators to which a number of subscribers are connected. A time-division exchange transmits speech and signalling intelligence by means of pulse code modulation (PCM). The signals are contained in the time slots of a frame and carried by multiplex lines. Each multiplex signal originates at an exchange or line concentrator with its own ("distant") clock. The time-division exchange has its own ("local") clock. As is well known, the distant and local clocks are neither in phase not exactly synchronous, and the various exchanges use different types of signalling. In particular, the signalling used within and electromechanical exchange is different than that used within a time-division exchange. It is therefore necessary to synchronise the incoming multiplex signals with the local clock and to deal with the different signalling methods so as to be able to use the signalling intelligence for the various operations carried out by the time-division exchange which receives information over these incoming multiplex lines. Multiplex connection units for time-division exchanges are described in the article "Groupement d'équipements de synchronisation du système de commutation temporelle Platon" by D. FEUERSTEIN, J. B. JACOB, R. RENOULIN and J. GUEZOU, in the journal "Commutation et Electronique" No. 34, July 1971, pages 7 to 24.

In the connection units described, the signalling receiving and sending circuits differ, according to whether the multiplex lines connect the time-division exchange to other time-division exchanges, to electromechanical exchanges or to line concentrators, the signalling mode differing in each case.

SUMMARY OF THE INVENTION

The present invention is intended to provide a multiplex connection unit for time-divisions exchanges which is less complex than previously known devices. The invention consists of a connection unit comprising identical modules connected by a control interface to control units of the exchange, each module being connected by incoming and outgoing multiplex lines to a line concentrator or to an electromechanical exchange or to another time-division exchange, each moduled also being connected to the switching network by as many multiplex lines as there are incoming and outgoing multiplex signals.

More specifically the present invention provides a multiplex connection unit for use in a time-division exchange which comprises a local clock, multiregisters, charging units, markers, a monitoring unit connected to an operation and maintenance centre and a switching network, and which is connected to other electromechanical or time-division exchanges or line conentrators by incoming and outgoing multiplex lines, wherein the connection unit comprises a control interface connected to the markers and to the monitoring unit and a multiplicity of identical connection modules each connected to incoming and outgoing multiplex lines, to the local clock, to the switchings network and to the multiregisters, each connection module comprising:

trandcoders each connected to an incoming multiplex line and to an outgoing multiplex line to convert a first code to a second code and vice versa;
a synchronising unit for each transcoder, each connected to one transcoder to detect a frame alignment word and to synchronise the time slots of the incoming multiplex signal with the local clock and to inject the frame alignment words into the outgoing multiplex signals;
a traffic distributor for tranferring the time slots of the incoming multiplex signals to the switching network and a signalling receiver and for transferring the time slots from the switching network to the outgoing multiplex signals while adding thereto signals received from a signalling sender connected to the input and output of each synchronising unit by two multiplex lines, and to the input and output of each switching network by as many multiplex pairs as there are synchronising units, and to the control interface;
a signalling receiver for detecting a multiframe alignment word, for receiving signals from each incoming multiplex lines and for sending said signals to the multiregisters connected to traffic distributor, to the control interface and to the multiregisters and
a signalling sender for receiving signals from the switching network relating to each outgoing multiplex signal and for sending said signals to the traffic distributor, said sender being connected to the switching network, to the control interface and to the traffic distributor.

BRIEF DESCRIPTION OF THE DRAWINGS

The invention will now be described in more detail, with reference to specific embodiments thereof shown in the accompanying drawings, in which.

DETAILED DESCRIPTION OF THE INVENTION

Figure 1:
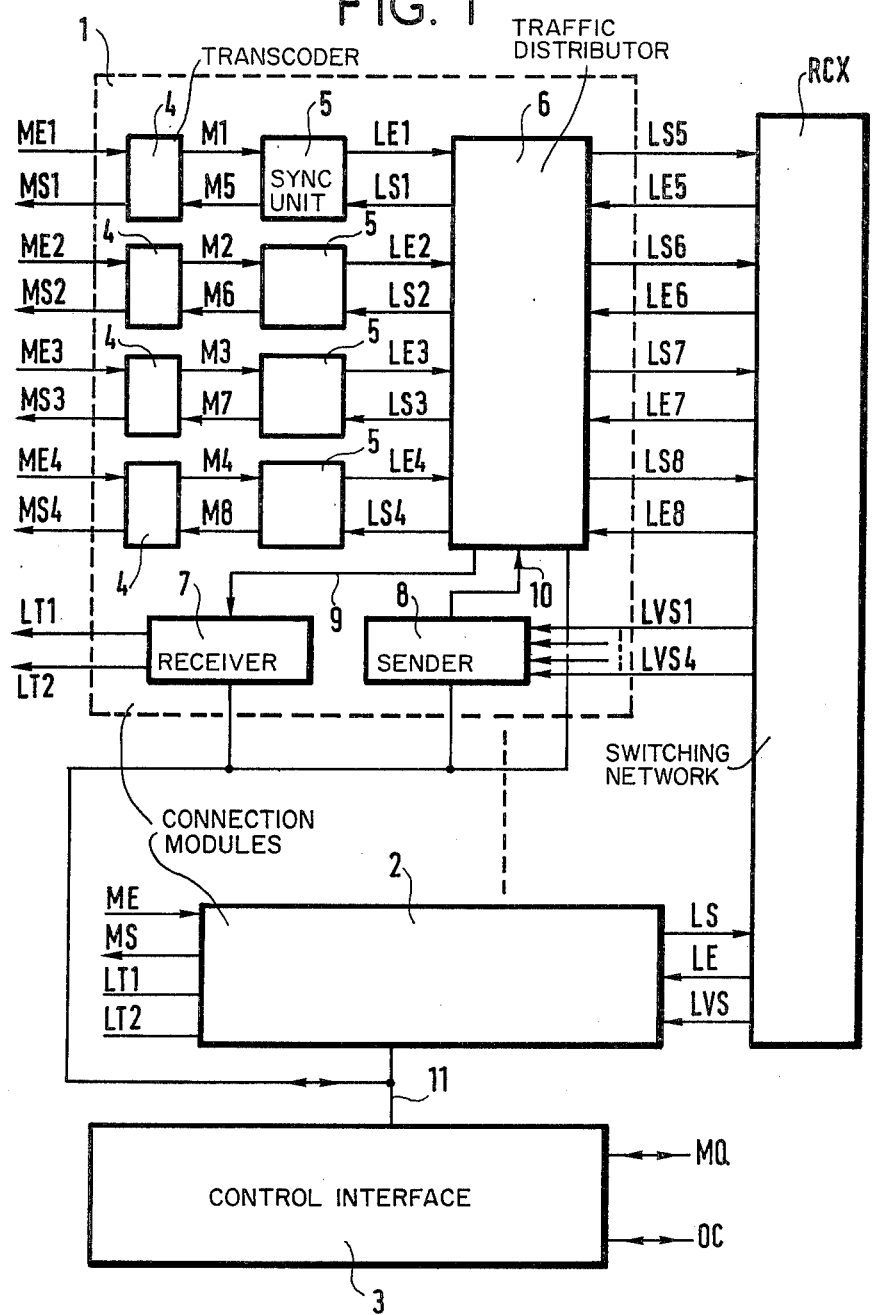
FIG. 1 is the block schematic of a connection unit in accordance with the invention.

FIG. 1 shows a connection unit in accordance with the invention, comprising identical connection modules 1 and 2 and a control interface 3. The various connection modules are connected to a switching network RCX. The switching network is also connected to other connection units identical to the one shown in FIG. 1.

A connection module (module 1, for example) comprises four transcoders 4, four synchronising units 5, a traffic distributor 6, a signalling receiver 7 and a signalling sender 8. Each transcoder is connected to an incoming multiplex line (ME1, ME2, ME3, ME4) and to an outgoing multiplex line (MS1, MS2, MS3, MS4). Each transcoder is connected to a synchronising unit by two multiplex lines (M1/M5, M2/M6, M3/M7, M4/M8), each multiplex line being allocated to one transmission direction.

The traffic distributor 6 is connected to each synchronising unit by an incoming multiplex line (LE1, LE2, LE3, LE4) and by an outgoing muliplex line (LS1, LS2, LS3, LS4). The traffic distributor is connected to the switching network by four incoming multiplex lines (LE5, LE6, LE7, LE8) and by four outgoing multiplex lines (LS5, LS6, LS7, LS8).

The signalling receiver 7 is connected to the traffic distributor by a link 9 and to the multiregisters of the exchange by links LT1 and LT2. The signalling sender 8 is connected to the traffic distributor by a link 10 and to the switching network RCX by links LVS1, LVS2, LVS3 and LVS4.

The control interface 3 is connected to the markers of the exchange by a link MQ. It is connected to the monitoring unit of the time-division exchange by link OC, the monitoring unit being itself connected to the operation and maintenance center. The control interface is also connected to the connection modules by a bus 11. In each module bus 11 is connected to the signalling receiver, to the signalling sender and to the traffic distributor.

The control interface may be of the standard logic type (ELS) described in the article "Concentrateur spati-temporel 500 abonnés pour système de commutation temporelle platon E10" by JACOB, RENOULIN and VOYER, in the journal "Commutation et Electronique" No. 34, July 1971, pages 25 to 47.

The transcoders such as transcoder 4 are also of a known type. In receive mode a transcoder recovers information from the incoming multiplex signal to which it is connected (ME1), recovers the distant clock and converts the HDB3 code to binary code. In send mode it converts binary code to HDB3 code.

Each synchronising unit 5 comprises a multiplex signal receiving circuit which synchronises a multiplex signal on line M1 for example with the local clock, and a multiplex signal sending circuit towards the transcoder. The multiplex receiving circuit comprises a frame alignment check word circuit and a circuit for synchronising the time slots; these may be of the type described in the aforementioned article in "Commutation and Electronique", No. 34, July 1971, except that the time-division signalling channels in the speech channel synchronising circuit are not eliminated as described in the article. The multiplex signal receiving circuit may be of the type described in co-pending U.S. Application Ser. No. 146,852 entitled "Multiplex synchroniser unit for use in a time-division exchange" claiming priority from French patent application No. 79 11094.

Figure 2:
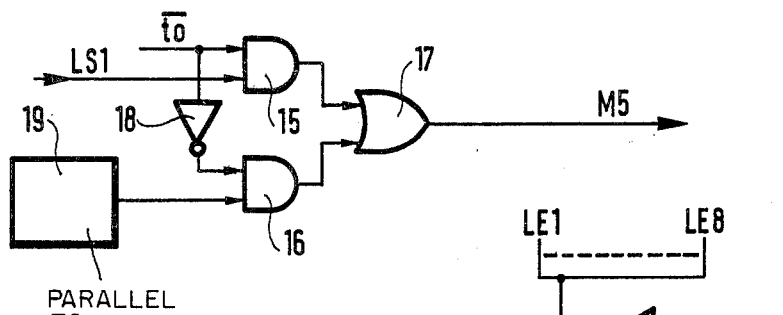
FIG. 2 shows a multiplex sender of the synchronisation device shown in FIG. 1.

The multiplex signal sending circuit which provides an input to the transcoder is shown in FIG. 2. An AND gate 15 has one input connected to the outgoing multiplex line LS1 from the traffic distributor and another input connected to receive the local clock signal $\overline{to}$, where to is a signal corresponding to time slot 0, containing the frame alignment words. The duration of signal to is 3.9 microseconds and its period is 125 microseconds. An AND gate 16 receives to by way of inverter 18. AND gate 16 receives a second input form parallel-to-series register 19 into which is loaded the eight bits representing the binary word in time slot 0.

The outputs of AND gates 15 and 16 are connected to an OR gate 17 which provides multiplex line M5.

Figure 3:
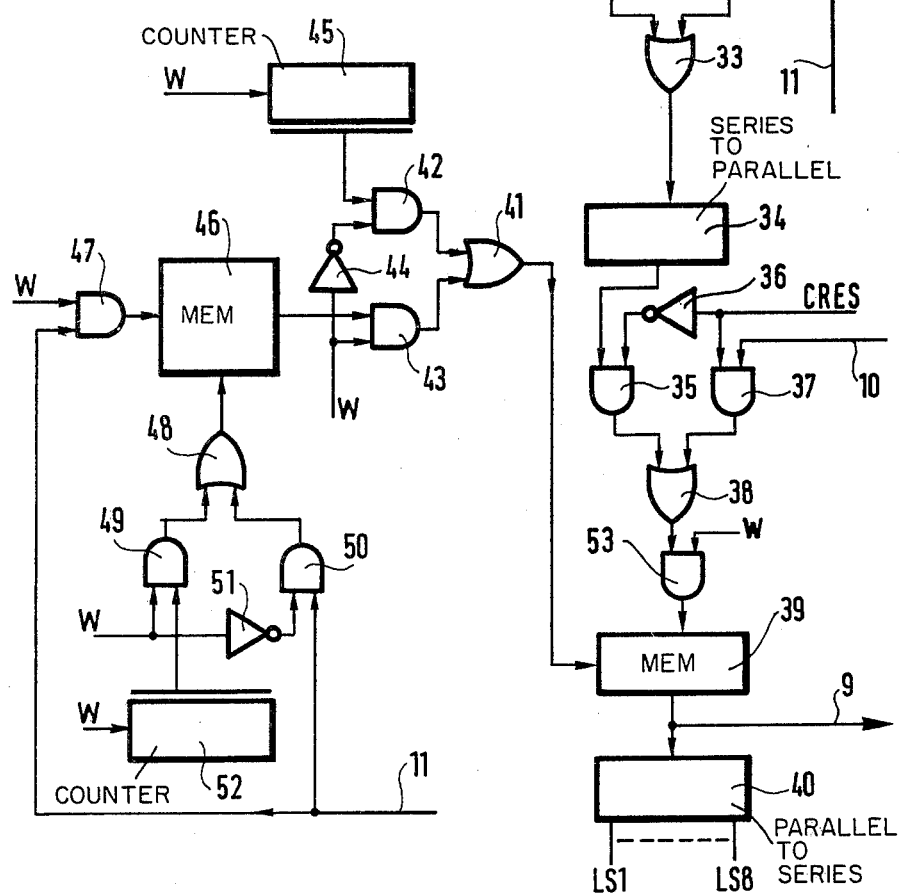
FIG. 3 shows a traffic distributor of FIG. 1.

FIG. 3 shows a traffic distributor 6 of the type disclosed in French patent application No. 79 02061 "Dispositif commandé de répartition de trafic pour un réseau de commutation temporelle". The incoming multiplex lines LE1 to LE8 are connected to one input of an AND gate 30 whose other input is connected via an inverter 31 to a control bit from bus 11. AND gate 32 receives both control and data inputs from bus 11. The outputs of AND gates 30 and 32 are connected to an OR gate 33 whose output is connected to a series to-parallel converter 34. The control interface can therefore deliver via bus 11 a signal inhibiting AND gate 30 and activating AND gate 32, or check signals. The output of the series to-parallel converter 34 is connected to one input of AND gate 35 having a second input connected to an inverter 36 which receives a signal CRES from the signalling sender 8. An AND gate 37 receives signal CRES on one input, another input being connected to link 10. The outputs of AND gates 35 and 36 are connected to an OR gated 38 whose output is connected to an AND gate 53 whose other input receives the clock signal w. The output of AND gate 53 is connected to the input of a buffer memory 39. The output of the buffer memory 39 is connected to the link 9 and to the input of a parallel-to-series converter 40 with its output connected to outgoing multiplex lines LS1 to LS8.

The buffer memory 39 is addressed by a circuit comprising an OR gate 41 with its output connected to the buffer memory, two AND gates 42 and 43 and an inverter 44. The outputs of the AND gates 42 and 43 are connected to the OR 41 gate. Signal w is applied to one input of AND gate 43 and to the inverter 44, which is connected to one input of the AND gate 42. Another input of AND gate 42 is connected to the output of a counter 45 controlled by signal w. Another input of AND gate 43 is connected to the output of a control memory 46.

The data input of the control memory 46 is connected to the output of an AND gate 47 which receives signal w on one input, the other input being connected to bus 11. The control memory is addressed by a circuit comprising an OR gate 48 and two AND gates 49 and 50. The output of the OR gate 48 is connected to the addressing input of the control memory 46. The output of AND gates 48 and 50 is connected to an input of the OR gate 48. AND gate 49 has one input connected to the output of a counter 52 controlled by signal w. Another input of AND gate 49 recives signal w. One input of AND gate 50 is connected to bus 11 and another input is connected to an inverter 51 receiving signal w. The buffer memory 39 is a 256-word × 8-bit memory with one word allocated to each time slot. Information in the time slots of incoming multiplex lines LE1 to LE8 is written cyclically using the 8-bit counter 45. Information sent over the link 10 is signalling intelligence to be sent only to outgoing multiplex lines LS1 to LS4. This information is written into the buffer memory when signal CRES is high, and can be sent in any time slot of outgoing multiplexes LS1 to LS4, the selection being based on directives from the control memory.

The buffer memory 39 is read using addresses provided by the control memory 46, which is a 256-word × 8-bit memory, each word defining a buffer memory address.

Write operations in the control memory are controlled by the control interface via bus 11. The control memory outputs the control memory write addresses (a control memory word whose number corresponds to a given time slot of a given outgoing multiplex LS1 to LS8). Signalling multiplex link 9 carries the same information as the outgoing multiplex multiplex lines, but taken directly from the buffer memory output. As the control memory is read cyclically, reading one word of the control memory provides the read address of a word of the buffer memory containing the information intended for the time slot of a given outgoing multiplex LS1 to LS8.

Writing in the buffer memory 39 is sequentially ordered by the counter 45 during one half-cycle of signal w. During the second half-cycle of signal w the control memory outputs a buffer memory read address.

Information from the buffer memory is applied to the parallel-to series converter 40 and to the signalling receiver 7 over link 9.

In this way traffic distributor 6 mixes and separates signals in both space and time switching modes. While the outputs of circuit elements 34, 45, 46 and 52 and lines 9, 10, and 11 are shown as being a single lead for the sake of simplicity, it can readily be seen that they comprise a plurality of lines. The associated logical elements 35, 37, 38, 53, 41–43, and 47–50 similarly represent the equivalent logical function, such as the AND operation, upon the associated plurality of lines simultaneously. Thus, OR gate 38 passes an 8 bit word from either of AND gates 35 or 37, for example. A similar convention is used in the remaining description and drawings.

Figure 4:
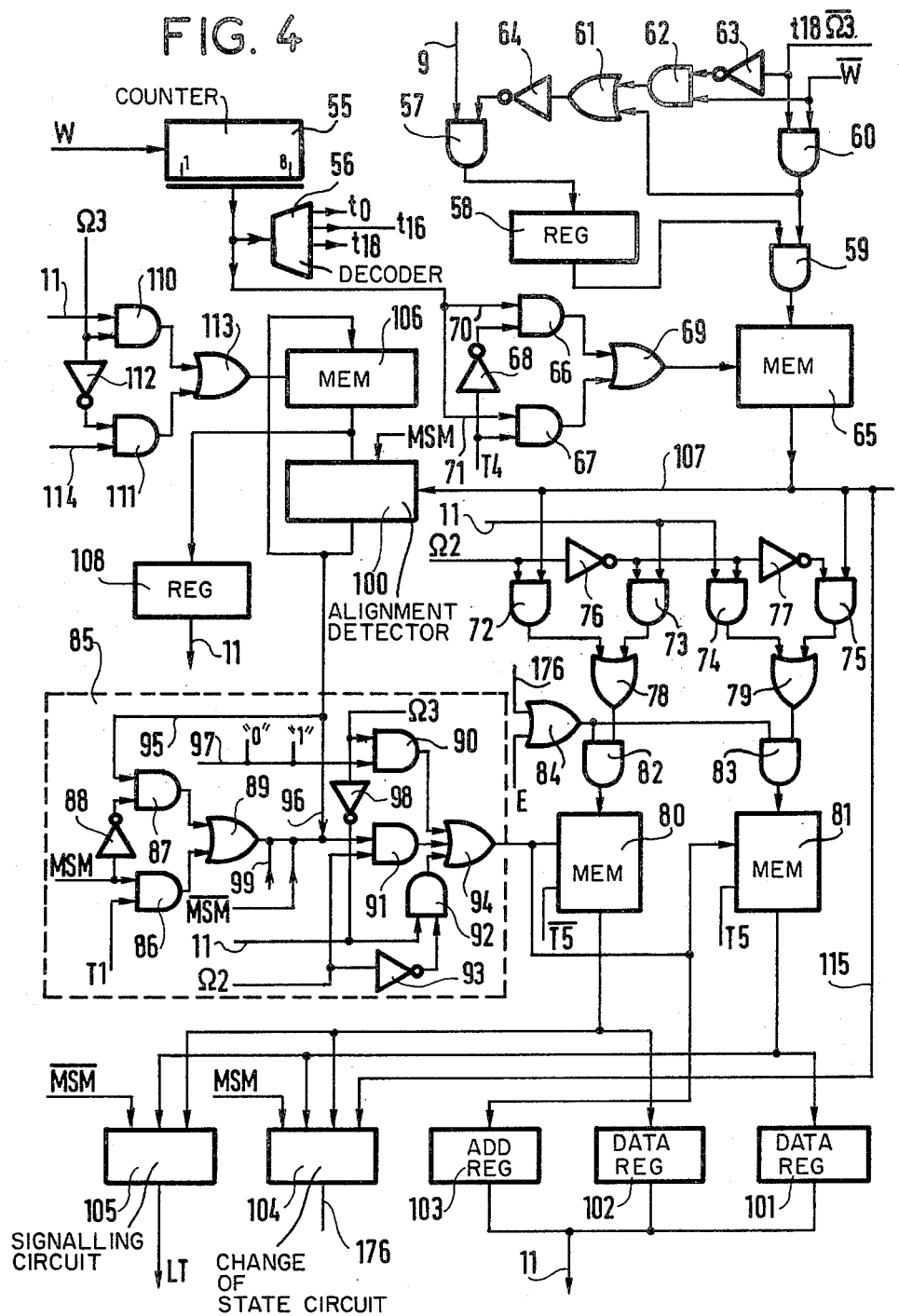
FIG. 4 shows a signalling receiver of FIG. 1.

FIG. 4 shows the signalling receiver 7 of FIG. 1. An 8-bit counter 55 is controlled by the local clock signal w. A decoder 56 is connected to its output to receive bits 4 to 8, and outputs the time slot signals to, t16, t18. An AND gate 57 has one input connected to link 9 from traffic distributor 6 output connected to an 8-bit register 58 whose output is in turn connected to an AND gate 59. An AND gate 60 receives signal w and t18.$\overline{\Omega 3}$, $\Omega 3$ being the third order sub-multiple of counter 55, corresponding to bit 3 of counter 55. The output of the AND gate 60 is connected to one input of AND gate 59 and to one input of an OR gate 61. An AND gate 62 receives signal w and signal t18.$\overline{\Omega 3}$ via an inverter 63. The output of gate 62 is connected to OR gate 61, whose output is connected via an inverter 64 to one input of AND gate 57. The output of the AND gate 59 is connected to a buffer memory 65 into which are loaded the signalling bytes present on link 9, corresponding to the four incoming multiplex lines LE1 to LE4 connected to the traffic distributor. The addressing circuit of memory 65 comprises two AND gates 66, 67, an inverter 68 which connects to one input of AND gate 66, and an OR gate 69. AND gate 66 receives bits 1 and 2 of counter 55 over link 70. AND gate 67 receives bits 5 and 6 over link 71. Inverter 68 receives signal T4 which corresponds to bit 7 of counter 55.

At the output of buffer memory 65, bits 1 to 4 are connected to an AND gate 75 and bits 5 to 8 are connected to an AND gate 72. Two AND gates 73 and 74 are connected to bus 11. A signal $\Omega 2$ from bit 2 of counter 55 is input to AND gate 72, to AND gates 73, 74 via an inverter 76, and to AND gate 75 via an inverter 77. AND gates 72 and 73 have their outputs connected to an OR gate 78. AND gates 74 and 75 have their outputs connected to an OR gate 79. The output of OR gate 78 is connected to an AND gate 82, the output of which is connected to a memory 80. The output of OR gate 79 is connected to an AND gate 83, the output of which is connected to a memory 81.

An OR gate 84 receives signal CRE from a change of state circuit 104 on one input, via link 176. On another input it receives a write signal E from bus 11. The output of OR gate 84 is connected to one input of each of the AND gates 82 and 83. The capacity of each of memories 80 and 81 is 256 words×4 bits. Each of memories 80 and 81 may also receive 4 bits from bus 11 via AND gates 73 and 74.

This circuit includes an AND gate 86 receiving one input signal T1 from bit 4 of counter 55 and on another input a signal MSM. When the connection module of which the signalling receiver forms a part is connected by incoming multiplex lines ME1 to ME4 and outgoing multiplex lines MS1 to MS4 (FIG. 1) to an exchange, signal MSM has the value "1". If the multiplex lines are connected to a line concentrator, signal MSM has the value "0". Signal MSM is input via an inverter 88 to AND gate 87, another input of which is connected via link 95 to the output of a multiframe alignment detection circuit 100. The outputs of AND gates 86, 87 are connected to an OR gate 89 whose output is connected to an AND gate 91 which also receives bits 5 and 6 from the counter over link 99, a signal $\overline{MSM}$, and the output of the multiframe alignment circuit, over link 96. AND gate 91 receives on another input a signal $\Omega 2$ from bit 2 of counter 55. An AND gate 90 is connected by a link 97 to bits 1 to 7 of counter 55, also receiving a signal of value "0" and a value of "1". On another input it receives signal $\Omega 3$ from bit 3 of counter 55. An AND gate 92 is connected to bus 11 and receives signal $\Omega 3$ via an inverter 98. Each of the AND gates 90, 91 and 92 is connected to an OR gate 94 whose output is connected to each addressing input of memories 80 and 81. These memories may be addressed by the counter 55 (AND gate 90) or by the bus 11 (AND gate 92) or by the multiframe alignment detection circuit 100 (AND gate 91).

When addressed by the counter, the address is given by bits 1 to 7 of the counter and by the signals of values "0" and "1". The "1" signal represents the most significant bit of the address, the "0" signal being the second most significant. Memories 80 and 81 are enabled simultaneously.

For addressing by the multiframe alignment circuit, bits 5 and 6 of the link 99 to the counter constitute the two least significant bits of the address. Link 96 outputs four bits which constitute the next four least significant bits. OR gate 89 outputs a signal which is the second most significant bit of the address, the most significant bit of which is constituted by signal $\overline{MSM}$.

Memories 80 and 81 are enabled in turn, the first when signal T5 of bit 8 of counter 55 has the value "0", the second when signal T5 has the value "1". For addressing by bus 11, that which outputs the eight bits constitutes an address. Memories 80 and 81 are addressed simultaneously.

The output of memory 81 is connected to a first data register 101. The output of memory 80 is connected to a second data register 102. The output of OR gate 94 of the addressing circuit 85 is connected to an address register 103. The outputs of memories 80 and 81 are connected to a change of state circuit 104 which is also connected to the output of the buffer memory 65 by a link 115. The outputs of memories 80 and 81 are connected to a signalling circuit 105 whose output is connected to links LT. Registers 101, 102 and 103 have their outputs connected to bus 11.

The multiframe alignment detection circuit has its input connected to the output of status memory 106 whose input is connected to the output of the multiframe alignment detection circuit. This circuit is also connected by link 107 to the output of the buffer memory 65. The output of the status memory is also connected to a status register 108, whose output is connected to bus 11.

The status memory is addressed by two AND gates 110 and 111 with their inputs connected via an inverter 112. The outputs of the AND gates are connected to an OR gate 113 which supplies the addresses to the status memory. AND gate 110 and inverter 112 receive signal Ω3 from bit 3 of counter 55. Another input of AND gate 110 is connected to bus 11, and another input of AND gate 111 is connected by link 114 to bits 5 and 6 of counter 55.

The function of the signalling receiver is to detect line signal changes of state and to send signalling over the LT links, after transcoding where applicable. The four signalling bytes on link 9 are acquired in register 58 and stored in buffer memory 65. There are two cases to consider: in the first case the connection module is connected to an exchange and signal MSM has the value "1". In the second case the connection module is connected to a line concentrator and the signal MSM has the value "0".

First case MSM = 1

Memories 80 and 81 are divided into four sectors each of 64 words. The first sector stores E wire signalling received in the preceding multiframe. The second sector stores the confirmed E wire signalling. The third sector stores the signalling to be sent on link LT (c and d signals).

During the even time slots of the second and fourth quarters of the frame, the samples available at the output of the buffer memory 65 are compared with the "preceding" samples stored in the first sector. This comparison is effected by the line signal change of state circuit 104. Non-identity activates a write signal CRE which enables loading of memories 80 and 81.

During subsequent odd time slots these same samples are compared with the "confirmed" samples stored in the second sector. Non-identity activates the write signal CRE and an interface signal which is sent to the control interface over bus 11. The write signal CRE enables loading of address register 103 which stores the signal change of state co-ordinates. When the interface signal is sent to the control interface, after reading address register 103, memories 80 and 81 are searched for the new confirmed signalling. After transcoding this is written into the third sector of the memories, for sending on the LT links.

Second case MSM = 0

Memories 80 and 81 are still subdivided into four sectors each of 64 words, but the first two sectors are not used. The third sector stores channel-allocated signalling transmitted in time slots of the first 16 frames of incoming multiplex lines ME1 to ME4 in the connection module. The fourth sector stores the common channel signalling sent in time slots of the last 16 frames of the incoming multiplex lines, signalling being performed over a 32-frame multiframe.

Whatever the signalling mode (channel-allocated or common channel), the signal on link 9 (repeated at the output of buffer memory 65) is compared with the confirmed signal. There is no longer a sector for the preceding signal in this case. Non-identity activates the write signal CRE and enables writing in the third sector of memories 80, 81 for channel-allocated signalling (for sending on link LT) or the fourth sector for common channel signalling (read by the control interface). In both cases (MSM = 1 and MSM = 0), the control interface 3 accesses memories 80 and 81 in write and read modes at the start of each time slot. It accesses address register 103 for resetting and reading, and accesses status memory 106 in read mode during the second half of a time slot.

Figure 5:
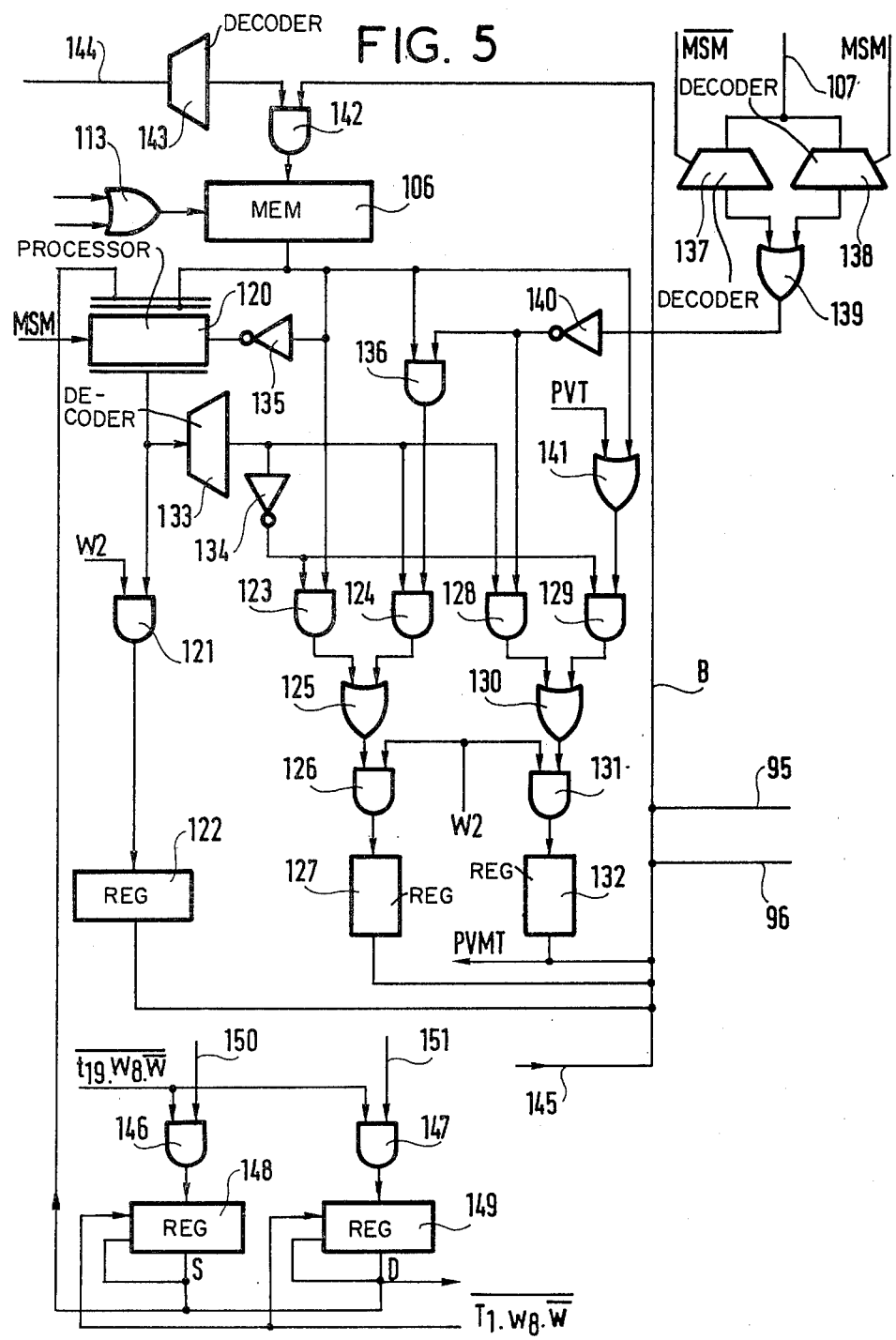
FIG. 5 shows a multiframe alignment detection circuit of FIG. 4.

FIG. 5 shows the alignment circuit 100 and the status memory 106 of FIG. 4. Bits 1 to 5 of the status memory are input to a function generator processor 120 (for example: TEXAS INSTRUMENTS 74181). The processor receives a signal MSM and its most significant bit is forced to 0 when MSM = 1. The 5-bit output of the processor is connected to an AND gate 121 which receives a signal w2 (second basic time interval of a time slot). The output of AND gate 121 is connected to a 5-bit register 122 whose output is connected to a bus B. Two AND gates 123 and 124 have their outputs connected to an OR gate 125 whose output is connected to an AND gate 126 receiving signal w2. Its output is connected to a unitary register 127 whose output is connected to bus B. Two AND gates 128 and 129 have their outputs connected to an OR gate 130 whose output is connected to an AND gate 131 receiving signal w2. The output of gate 131 is connected to a unitary register 132 whose output is connected to bus B.

A decoder 133 connected to the output of the processor decodes address 0. Its output is connected to AND gates 124 and 128. Its output is also connected via an inverter 134 to AND gates 123 and 129.

Bit 7 of status memory 106 is input to AND gate 123 and to an inverter 135 connected to an enabling input of the processor. Bit 6 of the status memory is connected to an AND gate 136 whose output is connected to AND gate 124.

Two decoders 137 and 138 are connected by link 107 to the buffer memory 65 of FIG. 4. The decoder 137 is enabled by the signal $\overline{MSM}$ if it has the value 1. The decoder 138 is enabled by the signal MSM if it has the value 1. Decoder 137 receives bits 1 to 5, 7 and 8 from the buffer memory and is programmed to decode the number 112. Decoder 138 receives bits 1 to 4 of the buffer memory and decodes the number 0. The decoder outputs are connected to an OR gate 139 whose output is connected via an inverter 140 to AND gates 128 and 136. An OR gate 141 receives bit 6 from status memory 106 and an out of frame alignment signal (PVT) formed by marshalling the out of frame alignment signals from each of the synchronising units 5. The 8-bit bus B is connected to the input of an AND gate 142 which also receives the output signal of a decoder 143 whose input is connected by link 144 to bits 4, 7 and 8 of counter 55 of FIG. 4, which decodes the number 3. Bits 1 to 5 of bus B come from register 122. Bit 6 comes from unitary register 132. Bit 7 comes from unitary register 127. Bit 8 is obtained from a link 145 from the signalling sender 8 of FIG. 1, after alarm marshalling on links LVS.

An AND gate 146 has its output connected to a register 148. An AND gate 147 has its output connected to a register 149. A signal $\overline{t19.W8.w}$ is input to each of the AND gates. Output bit 1 of each of the 4-bit parallel registers 148, 149 is looped to the register input. Register advance is controlled by the signal $\overline{t1.w8.w}$. The output of each register comprises bits 1 and 3. One input of AND gate 146 receives over link 150 a signal from each synchronising unit 5 of FIG. 1. An input of AND gate 147 receives over link 151 a signal from each synchronising unit 5. Register 148 outputs a signal S for a frame skip in the synchronising unit and register 149 outputs a signal D for a frame repetition in the synchronising unit. The outputs of registers 148 and 149 are connected to a second input of the processor 120.

If A is the signal on the first input to the processor and F is the processor output signal, the truth table is as follows:

| D | S | F |
|---|---|---|
| 0 | 0 | F = A + 1 |
| 1 | 0 | F = A |
| 0 | 1 | F = A + 2 |
| 1 | 1 | X |

Also, for:

| | |
|---|---|
| MSM = 0 | $0 \leq F \leq 31$ |
| MSM = 1 | $0 \leq F \leq 15$ |
| Processor enabling signal = 0 | F = 0 |

Bits 1 to 5 of status memory 106 on the first input of the processor determine the number of the frame associated with a signalling byte.

The signalling channel synchronisation state is characterised by two bits:
00—synchronised
01—synchronised+1 absence of multiframe alignment word
11—unsynchronised In the unsynchronised condition the processor output is forced to 0 and the signalling is monitored continuously.

Conformity with the multiframe alignment word enables the changeover from the unsynchronised state to the synchronised state and the following frames, and the incrementing of the frame number counter (bits 1 to 5 of the status memory).

To pass from the synchronised state to the unsynchronised state it is necessary to detect the absence of the multiframe alignment word in two consecutive 0 frames. The most significant bit (bit 5) of the frame number counter is forced to 0 if MSM=1 since in this case the multiframe comprises only 16 frames (connection module connected to an exchange). Bit 5 is forced to 0 in the processor. In the absence of disturbance occasioned by the associated synchronising unit (frame skip or repetition), the operation on the preceding frame number stored in the status memory is "increment by 1". For a frame skip the operation is "increment by 2". For a frame repetition the operation is "identity", as indicated in the above truth table. The new value loaded into register 122 addresses memories 80 and 81 over link 95 (bit 5) and 96 (bits 1 to 4). These memories are used to store signalling information received on previous multiframes during the second quarter of each time slot.

Figure 6:
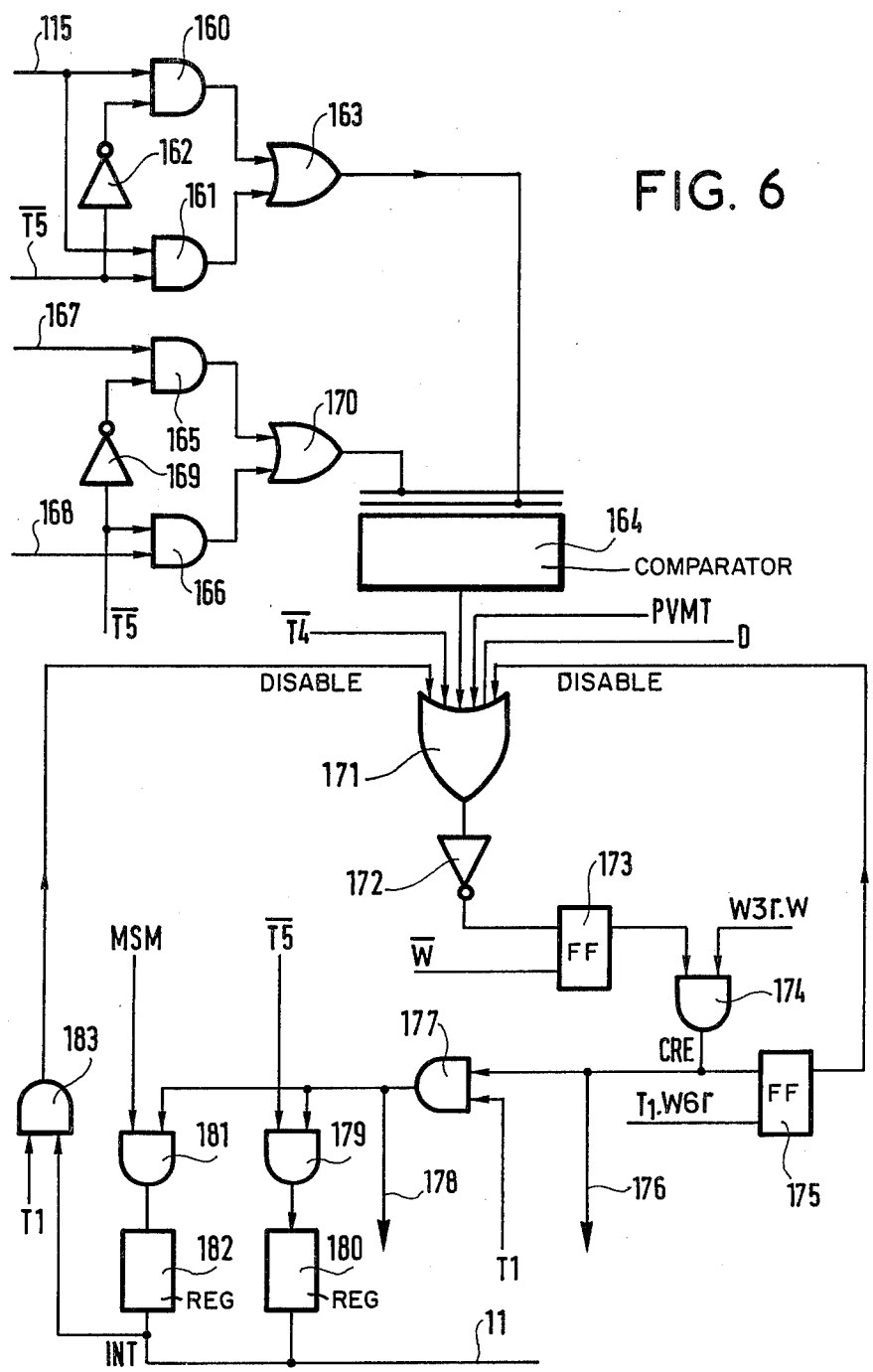
FIG. 6 shows a change of state circuit of FIG. 4.

FIG. 6 shows the line signal change of state circuit 104 of FIG. 4. Two AND gates 160 and 161 are connected by link 115 to the output of the buffer memory 65. AND gate 160 receives bits 1 to 4 and AND gate 161 receives bits 5 to 8. The signal $\overline{T5}$ corresponding to the 0 value of bit 8 of counter 55 (FIG. 4) is input to AND gate 161 and, via an inverter 162, to AND gate 160. The outputs of the AND gates are connected to an OR gate 163 whose output is connected to one input of a comparator 164.

An AND gate 165 is connected by a link 167 to memory 81. An AND gate 166 is connected by a link 168 to memory 80. The signal $\overline{T5}$ is input to AND gate 166 and, via an inverter 169, to AND gate 165. The outputs of the AND gates are connected to an OR gate 170 whose output is connected to another input of the comparator 164. The output of the comparator is connected to OR gate 171 whose output is connected through an inverter 172 to flip-flop 173 which also receives the clock signal w. The output of this flip-flop is connected to an AND gate 174 which receives a signal w3r.w, w3r signal w3 retarded by one half-period. AND gate 174 outputs signal CRE to flip-flop 175 which also receives a clock signal t1.w6r. The output of this flip-flop is connected to one input of OR gate 171. Signal CRE is sent over link 176 to an input of OR gate 84 (FIG. 4) to control memory write operations as indicated in the description with reference to FIG. 4. Signal CRE is also input to an AND gate 177 which receives signal T1 (bit 4 of counter 55). The output signal from AND gate 177 is sent over link 178 to the input of the address register 103 (FIG. 4) to control writing in this register, and is also input to an AND gate 179 which receives signal $\overline{T5}$, its output being connected to a unitary register 180 with its output connected to bus 11. The output signal of AND gate 177 is also input to an AND gate 181 which receives signal MSM. The output of this AND gate is connected to a unitary register 182 whose output applies signal INT to bus 11 and to an AND gate 183 which receives signal T1. The output of the AND gate 183 is connected to one input of the OR gate 171 which also receives a signal $\overline{T4}$, an out of multiframe alignment signal (PVMT) from the unitary register 132 (FIG. 5), and a frame repetition signal (D) from register 149 (FIG. 5). Signals $\overline{T4}$, D and PVMT and the signals output by AND gate 183 and flip-flop 175 mask non-identities detected by the comparator 164 which compares a line signal at the output of buffer memory 65 with the signal read from memories 80 and 81. Non-identity during an even time slot automatically activates signal CRE and flip-flop 175, the output of which disables OR gate 171 to inhibit processing during the next odd time slot. Non-identity during an odd time slot activates signal CRE, AND gate 177, register 180 (if value of signal T5 is 1), and unitary register 182 which outputs signal INT to bus 11 (if signal MSM has the value 1), signal INT disabling OR gate 171 via AND gate 183 during subsequent odd time slots.

Figure 7:
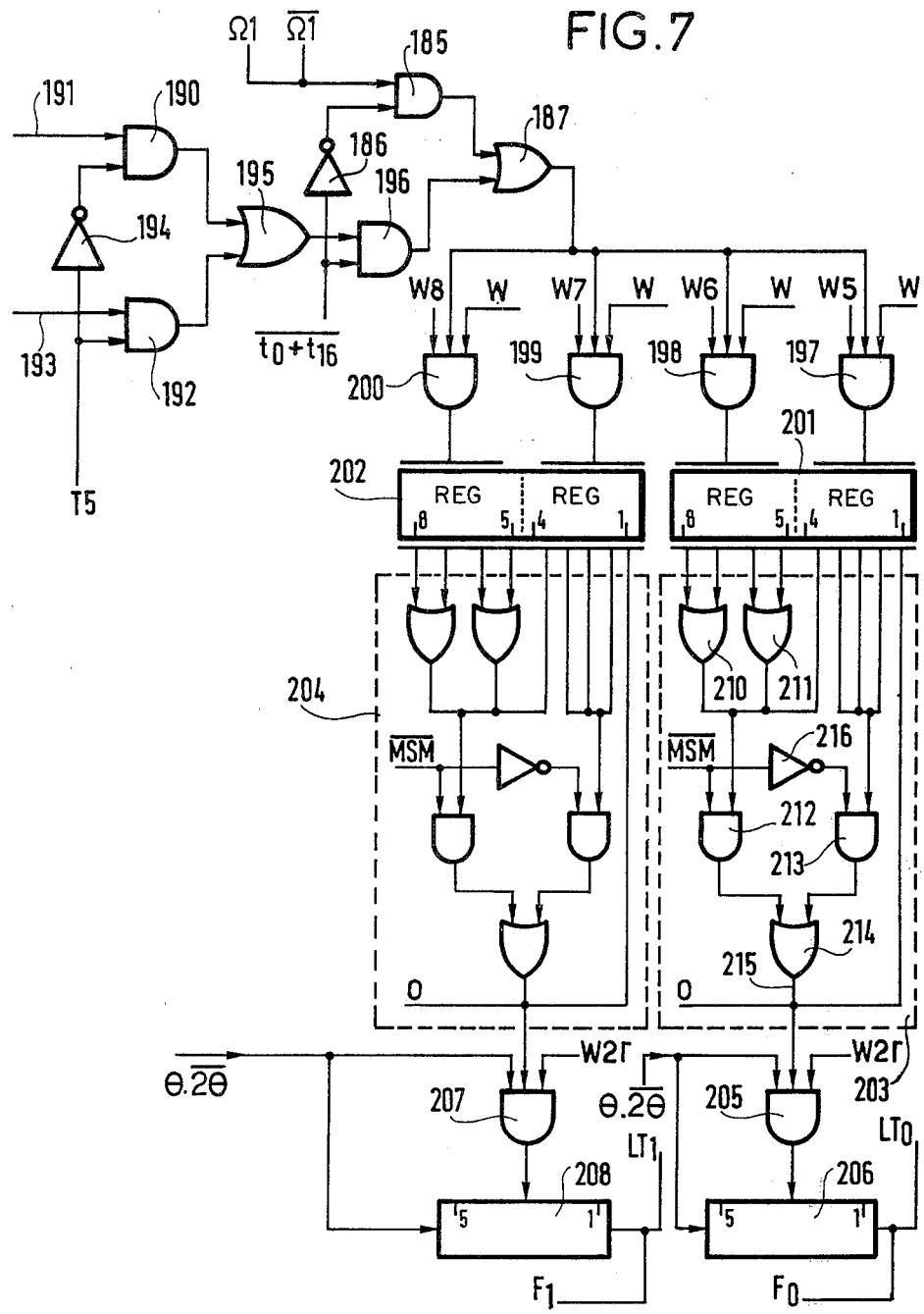
FIG. 7 shows a circuit for sending signals over the LT links in FIG. 4.

FIG. 7 shows the signalling circuit 105 of FIG. 4, which sends signals to links LT. An AND gate 190 is connected by a link 191 to the output of the memory 81, from which it receives signalling bits 1 to 4. An AND gate 192 is connected by a link 193 to the output of the memory 80 from which it receives signalling bits 5 to 8. A signal T5 is applied to AND gate 192 and via an inverter 194 to the AND gate 190. The outputs of the AND gates are connected to an OR gate 195 with its output connected to an AND gate 196 which receives the signals $\overline{t0}$ +t16. The output of AND gate 196 is connected to one input of an OR gate 187 whose other input is connected to an AND gate 185. This receives on one input signals $\overline{\Omega 1}$ and $\Omega 1$ from bit 1 of counter 55.

Another input is connected via an inverter 186 to one input of the AND gate 196. Four AND gates 197, 198, 199 and 200 have one input connected to the output of OR gate 187 and receive signal w. The AND gate 197 receives signal w5, the AND gate 198 receives signal w6, the AND gate 199 receives signal w7 and the AND gate 200 receives signal w8.

An 8-bit parallel/parallel register 201 is connected to the outputs of AND gates 197 and 198. An 8-bit parallel/parallel register 202 is connected to the outputs of AND gates 199 and 200.

At the output of register 201 a marshalling circuit 203 has its output connected to an AND gate 205 which receives the signals w2r and $\theta.\overline{2\theta}$, where $\theta$ is a signal at 2.56 MHz derived from the exchange time base. The AND gate 205 is connected to a 5-bit parallel/series register 206 controlled by signal $\theta.\overline{2\theta}$. Its output is connected to a link LTo and a link Fo.

At the output of register 202 the marshalling circuit 204 identical to circuit 203 has its output connected to an AND gate 207 which receives signals w2r and $\theta.\overline{2\theta}$. The AND gate 207 is connected to a 5-bit parallel/series register 208 controlled by signal $\theta.\overline{2\theta}$, its output being connected to link LT1 and link F1. The two links LTo and LT1 constitute link LT in FIG. 1. Links So and S1 are used for test purposes, and are connected to the signalling sender 8 of FIG. 1.

The marshalling circuit 203 comprises: an OR gate 210 connected to bits 4 and 8 of the register, an OR gate 211 connected to bits 3 and 7, an AND gate 212 connected to the outputs of gates 210 and 211 and to bit 6 of the register, an AND gate 213 connected to bits 2, 5 and 6 of the register and an OR gate 214 connected to AND gates 212 and 213. The output of the OR gate 214 is connected to the AND gate 205 by a link 215 which also carries bit 1 from the register and a signal 0. Signal $\overline{MSM}$ is input to AND gate 212 and, via an inverter 216, to AND gate 213.

Thus, in register 206, bit 1 corresponds to bit 1 of register 201, bit 2 to bit 2 or bit 3 or bit 7 of register 201, bit 3 to signal 0, bit 4 to bit 5 or bit 6 of register 201 and bit 5 to bit 6 or bit 4 or bit 8 of register 201.

As the marshalling circuit 204 is identical to circuit 203, the correspondence between the bits of register 208 and those of register 202 is the same as indicated above.

The bits of memories 80 and 81 are loaded into registers 201, 202 at the end of time intervals w5, w6, w7 and w8. After marshalling in the marshalling circuits 203 and 204, these signalling bits are loaded into registers 206 and 208 and sent in serial mode over links LTo and LT1. The marshalling of the bits in the marshalling circuits is conditioned by the signal $\overline{MSM}$. The bits of registers 206 and 208 therefore receive different bits from registers 201 and 202, according to whether the marshalling module including the signalling circuit shown in FIG. 5 is connected to an exchange or a line concentrator.

Figure 8:
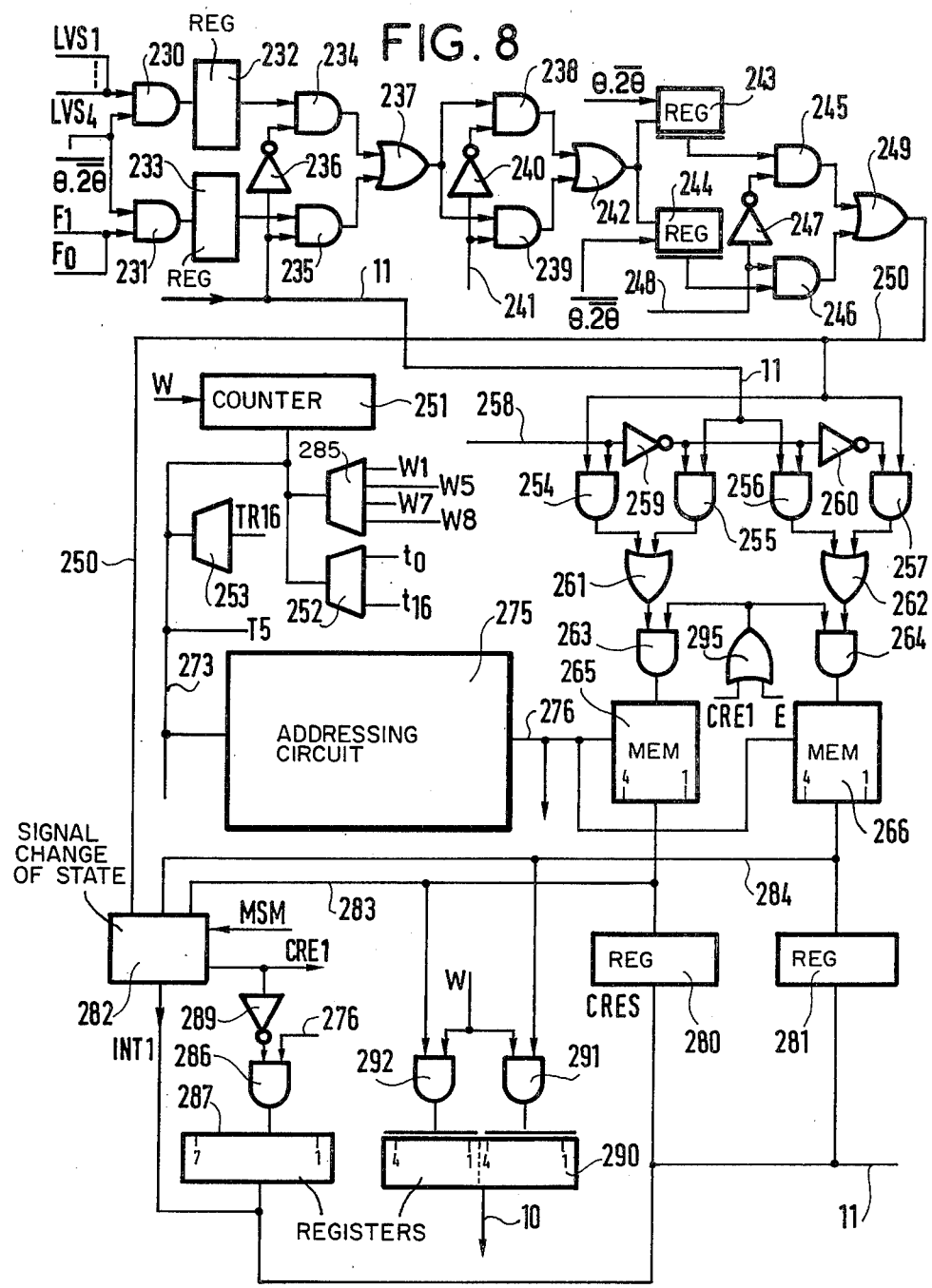
FIG. 8 shows a signalling sender of FIG. 1.

FIG. 8 shows the signalling sender 8 of FIG. 1. An AND gate 230 is connected to the signalling links LVS1 to LVS4 (FIG. 1) which transfer the signals to be sent over the outgoing multiplex lines LS1 to LS4 from the traffic distributor 6 shown in FIG. 1. Another AND gate 231 is connected to links Fo and F1 (outputs of registers 206 and 208 in FIG. 7). The signals on these links are used for test purposes only. The AND gates 230, 231 are activated by a signal $\theta.\overline{2\theta}$. The output of AND gate 230 is connected to a 4-bit register 232 whose output is connected to an AND gate 234. The output of the AND gate 231 is connected to a 4-bit register 233 whose output is connected to an AND gate 235.

Bus 11 is connected to one input of AND gate 235 and via an inverter 236 to an input of AND gate 234. The control interface 3 (FIG. 1) activates AND gate 235 for test purposes over bus 11. The tests are therefore based on the signals on links Fo, F1. The outputs of AND gates 234 and 235 are connected to an OR gate 237 whose output is connected to AND gates 238 and 239. AND gate 238 receives the odd-numbered bits (1, 3) of register 232 (or register 233). AND gate 239 receives the even-numbered bits (2, 4) of register 232 (or register 233). A link 241 carrying bit 9 of a counter 251 is connected to AND gate 239 and via an inverter 240 to AND gate 238. AND gates 238 and 239 have their outputs connected to an OR gate 242 whose output is connected to two series/parallel registers 243 and 244, of 6 and 7 bits, respectively. Register 243 is controlled by signal $\theta.\overline{2\theta}$ and register 244 by signal $\theta.\overline{2\theta}$. During one frame, defined by bit 9 of the counter, register 243 stores signalling information relating to link LVS1 and register 244 stores signalling information relating to link LVS3. During the next frame register 243 stores signalling relating to link LVS2 and register 244 signalling relating to link LVS4. The output of register 243 is connected to an AND gate 245 and the output of register 244 is connected to an AND gate 246. A link 248 carrying bit 2 of the counter is connected to the AND gate 246 and via an inverter 247 to the AND gate 245. The outputs of AND gates 245 and 246 are connected to an OR gate 249 whose output is connected to a link 250. A 13-bit counter 251 is controlled by clock signal w.

A decoder 285 connected to bits 1–3 of the counter 251 outputs to produce signals w1, w5, w7 and w8 upon detection. The the numbers O, 4, 6 and 7, respectively. A decoder 252 connected to bits 4–8 outputs time slot signals t0 and t16, corrsponding to the decoded numbers 0 and 16. A decoder 253 connected to bits 9–13 of the counter outputs a "frame 16" signal TR16 corresponding to the decoded number 16. Signal T5 corresponds to bit 8 of the counter.

Two OR gates 254 and 257 are connected to AND gate 249 by link 250. Two other AND gates 255 and 256 are connected to bus 11 from which they receive the M wire and common channel signalling. A link 258 connected to bit 3 of the counter is connected to AND gate 254 and via an inverter 259 to AND gates 255 and 256. It is connected via another inverter 260 to AND gate 257. An OR gate 261 combines the outputs of AND gates 254 and 255. An OR gate 262 combines the outputs of AND gates 256 and 257. The output of the OR gate 261 is connected to an AND gate 263 and the output of the OR gate 262 is connected to an AND gate 264. AND gates 263 and 264 receive a signal from the output of an OR gate 295 to write into memories 265 and 266 256 words each of 4 bits, divided into 4 equal sectors of 64 words. One input of OR gate 295 receives signal CRE1 and another input receives a write signal E from bus 11.

In memories 265 and 266 the second and third sectors are used for a connection module linked to an exchange (MSM=1); the second sector receives the a and b signals transferred over links LVS and the third sector is allocated to M wire signal changes.

In the case of a connection module connected to a line concentrator (MSM=0), the third and fourth sectors are used; the third sector is used for channel-allocated signalling and the fourth sector for common channel signalling.

Figure 9:
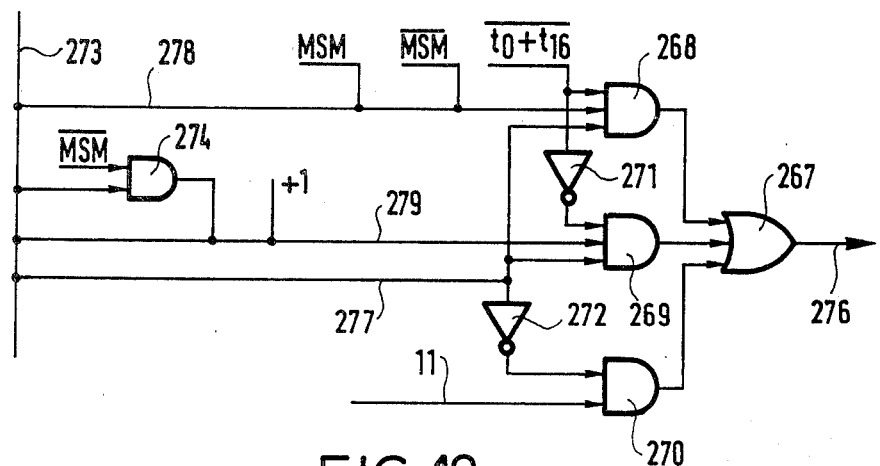
FIG. 9 shows an addressing circuit of FIG. 8.

The memories are parallel addressed by an addressing circuit 275 shown in FIG. 9. An OR gate 267 is connected by a link 276 to an addressing input of each of memories 265 and 266. Three AND gates 268, 269 and 270 have their outputs connected to the OR gate 267. A link 273 is connected to the output of counter 251 and carries the bits of this counter. A signal $\overline{to + t16}$ is input to AND gate 268. AND gates 268 and 269 are connected by a link 277 to link 273, receiving bit 3. AND gate 270 is connected by an inverter 272 to bit 3 of the counter. AND gate 268 is connected by a link 278 to link 273 and receives bits 9, 2, 4, 5, 6 and 7 from the counter, a signal MSM which constitutes the most significant bit of the address, and a signal $\overline{MSM}$ which constitutes the second most significant bit of the address. When MSM=1, the first, second and fourth sectors of the memories are not addressed. When MSM=0 ($\overline{MSM}=1$) the first three sectors are not addressed. The AND gate 269 is connected by a link 279 to link 273 and receives bits 1, 2, 9, 10, 11 and 12 from the counter. It is also connected to receive a signal +1 which constitutes the most significant bit of the address. An AND gate 274 receives bit 13 from the counter and signal MSM, and its output is connected to AND gate 269. The output signal from AND gate 274 is the second most significant bit of the address provided by AND gate 269. When $\overline{MSM}=1$ the fourth sector of the memories is addressed only when bit 13 has the value 1. When bit 13 has the value 0 the third sector is addressed. When $\overline{MSM}=0$ only the third sector is addressed. AND gate 270 is connected to bus 11 which supplies the memory read and write addresses. Memories 265 and 266 are always enabled, with one exception: when the memory address is supplied by AND gate 268 memory 265 is enabled during the first half of the frame and memory 266 during the second half.

Memories 265 and 266 (FIG. 8) have their outputs connected to two registers 280 and 281, respectively. These are 4-bit parallel/parallel registers, and their outputs are connected to bus 11. Memories 265 and 266 also have their outputs connected to a signal change of state circuit 282 over respective links 283 and 294. The signal change of state circuit is connected by link 250 to the output of the OR gate 249. The signal change of state circuit outputs signal INT1 to bus 11 and signal CRE1 to the OR gate 295 and via an inverter 289 to an AND gate 286 with its output connected to a 7-bit parallel/parallel address register 287 having its output connected to bus 11. AND gate 286 also has its input connected by link 276 to the output of the addressing circuit 275.

A signalling register 290 has its output connected over link 10 to the traffic distributor 6 (FIG. 1). This register is an 8-bit parallel/parallel register and is divided into two 4-bit sectors, one connected to the output of an AND gate 291 and the other connected to the output of an AND gate 292. AND gates 291 and 292 receive clock signal w. AND gate 291 is connected to the output of the memory 266 and AND gate 292 is connected to the output of the memory 265.

Figure 10:
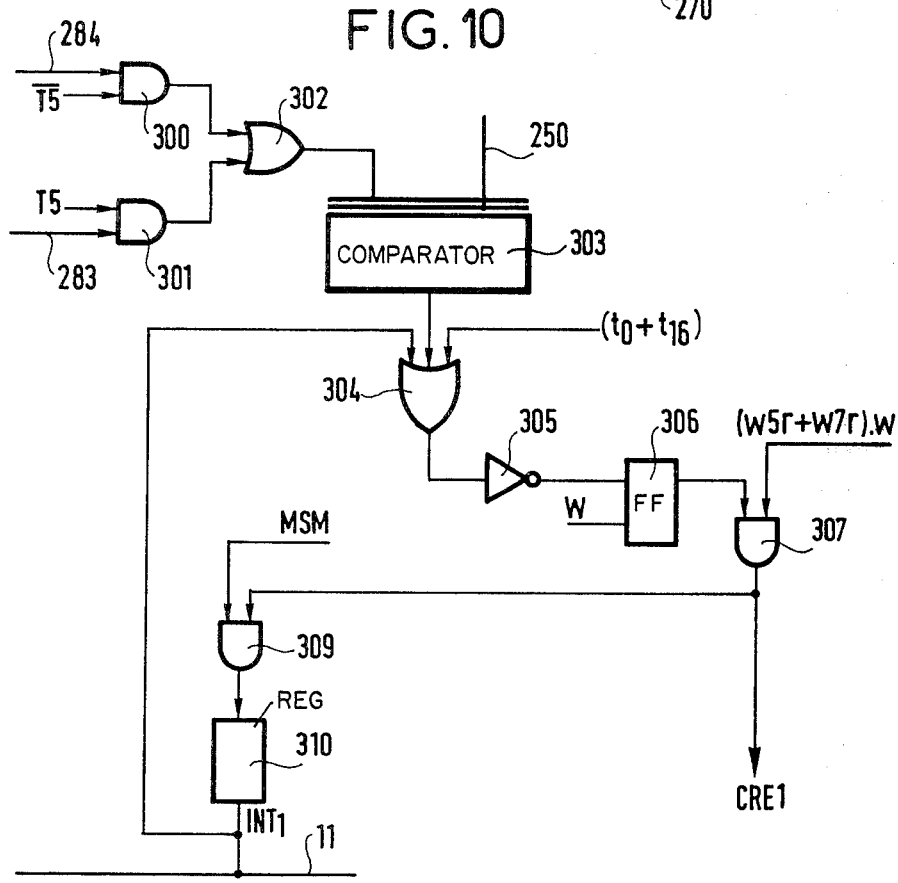
FIG. 10 shows a change of state circuit of FIG. 8.

FIG. 10 shows the signal change of state circuit 282. An AND gate 300 has its input connected over link 284 to the output of memory 266, and receives the signal $\overline{T5}$. An AND gate 301 is connected over link 283 to the output of the memory 265, and receives the signal T5.

The outputs of AND gates 300 and 301 are connected to an OR gate 302 whose output is connected to the input of a comparator 303. Another input of the comparator is connected over link 250 to the output of OR gate 249. The comparator output is connected to an OR gate 204 whose output is connected to the flip flop 306 via an inverter 305. The flip flop also receives clock signal w, and its output is connected to an AND gate 307 which receives signal (w5r+w7r).w, to thereby output a signal CRE$_1$. An AND gate 309 is connected to the output of AND gate 307. Signal MSM is input to AND gate 309, whose output is connected to a unitary register 310. The output of unitary register 310 is connected to OR gate 304 and to bus 11, to which it suppies signal INT1. Non-identity of the input signals to comparator 303 sets flip flop 306 to the 1 state, and AND gate 307 outputs signal CRE1. The unitary register 310 outputs signal INT1 to bus 11 and its output activates OR gate 304, which is also activated by a signal (to+t16).

The function of the signalling sender (FIG. 8) is to detect signal changes on signalling links LVS1 to LVS4 which constitutes a link LVS for FIG. 1, and to send signalling to the traffic distributor 6 (FIG. 1) when signal CRES (signal t16. $\Omega$3 retarded by a half-period of signal w), has the value 1.

Memories 265 and 266 receive data from bus 11 or over links LVS1 to LVS4. The memories are addressed by the control interface (using bus 11) during the first half of each time slot (signal $\Omega$3 corresponding to bit 3 of counter 251) or by counter 251 during the second half of each time slot.

During time slots other than to and t16 the counter is used to secure the confirmed sample which will be compared with the corresponding sample carried by one of links LVS1 to LVS4. For non-identity the latter sample will replace the confirmed sample in the second sector of the memories (addresses 64 to 127) in the case of a connection module connected to an exchange (MSM=1) or in the third sector of the memories (addresses 128 to 191) if MSM=0.

When MSM=1 the control interface is informed of the change of state by signal INT1 from change of state circuit 282. The co-ordinates of this change of state are available in register 287 connected to the output of the memory addressing circuit 275. This datum is rewritten into the third sector of the memory after transcoding. Signalling on links LVS1 and LVS3 is processed during the even-numbered frames and that on links LVS2 and LVS4 during the odd-numbered frames.

During time slots to and t16 the counter 251 is used to read the signalling to be sent to the traffic distributor 6, that is to say the channel-allocated signalling contained in the third sector of the memories and the common channel signalling (MSM=0) contained in the fourth sector of the memories. If there is no meaningful message to send using common channel signalling, a so-called "dummy" code is sent. A common channel signalling message is only sent if totally written by the control interface. These functions are easily provided by a circuit based on a memory with a capacity of 4 words×1 bit. This memory is addressed by the two least significant bits on link 276. In the absence of any message, the associated memory word has the value 0 and a dummy code is sent. When the message is totally written the control interface sets the memory word to 1 over bus 11. This enables the transmission of the message as soon as bit 13 of counter 251 goes to the value 1.

The four signalling samples corresponding to links LVS1 to LVS4 are sent at the following times: t16.w5, t16.w6, t16.w7, t16.w8.

The control interface uses bus 11 to access memories 265 and 266 in write and read modes during the first half of a time slot (w1 to w4), and unitary register 310 in reset and read modes and address register 287 in read mode.

Figure 11:
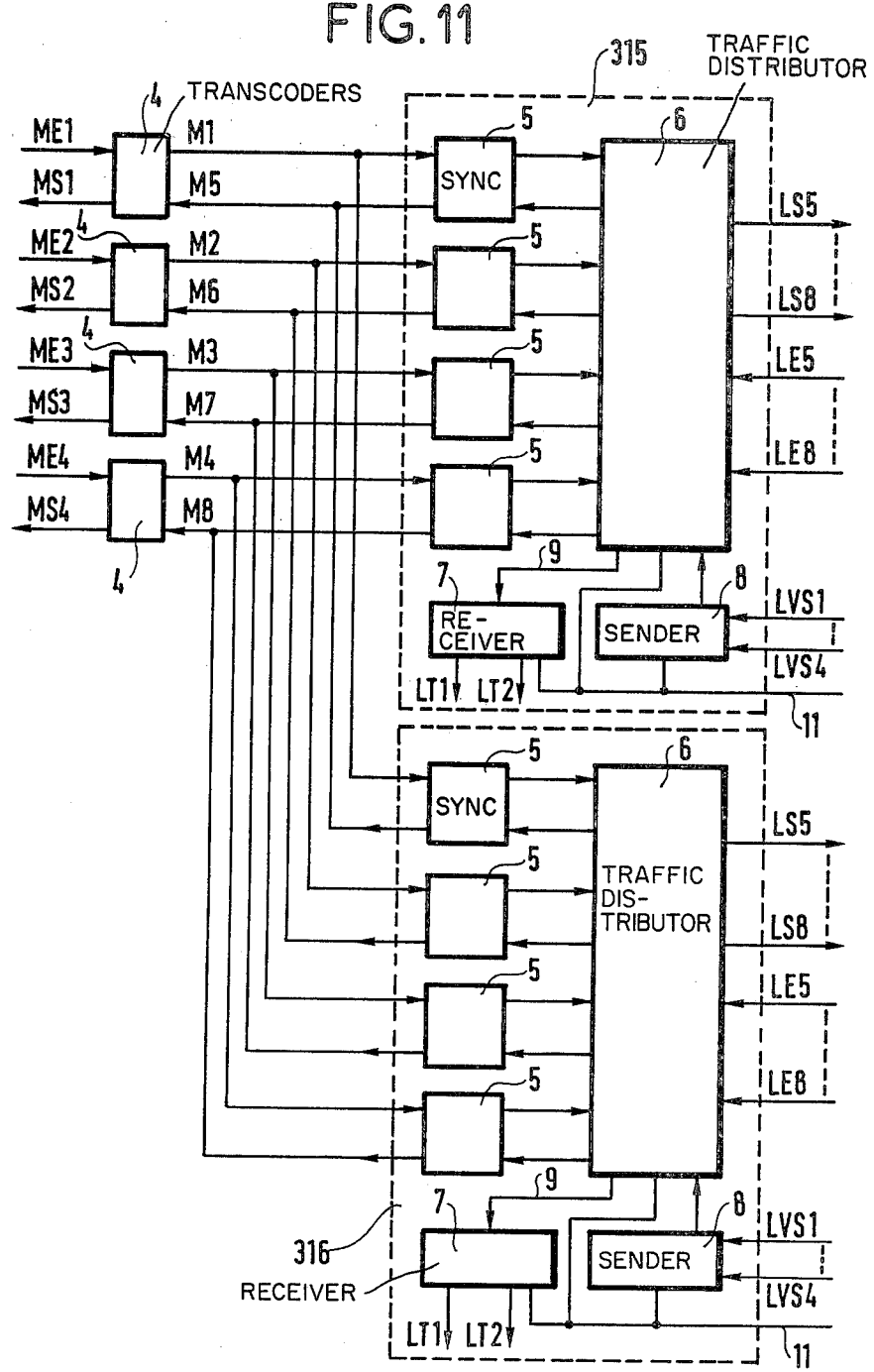
FIG. 11 shows two subsystems of a connection module in accordance with the invention.

FIG. 11 shows two identical subsystems 315 and 316 connected to four transcoders 4. For reasons of security, it is advantageous to duplicate certain units of a connection module as shown in FIG. 1.

In FIG. 11 the transcoders 4 are not duplicated. Each subsystem therefore comprises, as in the connection module, four synchronising units 5 connected to the transcoders, a traffic distributor 6, a signalling receiver 7 and a signalling sender 8. The transcoders 4 are connected to incoming multiplex lines ME1 to ME4 and to outgoing multiplex lines MS1 to MS4. Multiplexes M1 to M8 of FIG. 1 are duplicated, a transcoder being connected to a synchronising unit in each subsystem 315 and 316. Each traffic distributor is connected to a switching network. This arrangement enables one system to be substituted for the other in the event of a malfunction. The control interface 3 (FIG. 1) exchanges messages with only one subsystem. In the event of a malfunction in one subsystem messages are exchanged with the other subsystem.

We claim:

1. A multiplex connection unit for use in a time-division exchange having a local clock, multiregisters, charging units, markers, a monitoring unit connected to an operation and maintenance center and a switching network, and which is connected to other electromechanical or time-division exchanges or line concentrators by incoming and outgoing multiplex lines, wherein the connection unit comprises a control interface (3) connected to (a) the markers, (b) the monitoring unit and (c) a multiplicity of identical connection modules (1), the connection modules each connected to incoming and outgoing multiplex lines to the local clock, to the switching network (RCX) and to the multiregisters, each connection module comprising:
a plurality of transcoders (4) each connected to an incoming multiplex line (ME) and to an outgoing multiplex line (MS) to convert a first code to a second code and vise versa;
a plurality of synchronising units (5), each connected to one transcoder (4) to detect a frame alignment word and to synchronise time slots of the incoming multiplex line with the local clock and to inject the free alignment words into the outgoing multiplex lines;
a traffic distributor (6) for transferring the time slots of the incoming multiplex lines to the switching network and to a signalling receiver (7) and for transferring the time slots from the switching network to the outgoing multiplex lines while adding thereto signals received from a signalling sender (8) connected to (a) the input and output of each synchronising unit by two multiplex lines (LE, LS), (b) the input and output of each switching network by as many multiplex pairs (LE5 to LE8, LS5 to LS8) as there are synchronising units, and (c) to the control interface;
a signalling receiver (7) for detecting a multiframe alignment word, for receiving incoming signals from each incoming multiplex line and for sending said incoming signals to the multiregisters connected to the traffic distributor (6), to the control interface and to the multiregisters; and
the signalling sender (8) receiving outgoing signals from the switching network (RCX) relating to each outgoing multiplex and for sending said outgoing signals to the traffic distributor, said sender being connected to the switching network, to the control interface and to the traffic distributor (6).

2. A multiplex connection unit according to claim 1, wherein the traffic distributor (6) comprises a local counter (45), an input register (34), a buffer memory (39), an output register (40) and a buffer memory addressing circuit, the input register (34) and the output register (40) each being connected to (a) each synchronising unit (5) by a multiplex line (LE1 to LE4, LS1 to LS4) and (b) to the switching network (RCX) by as many multiplexes (LE5 to LE8, LS5 to LS8) as there are synchronising units, the buffer memory (39) having its input connected to the input register and to the signalling sender (8) and having its output connected to the output register and to the signalling receiver (7), the addressing circuit being connected to the local counter (45) and to the control interface (3).

3. A multiplex connection unit according to claim 1, wherein the signalling receiver (7) comprises a local counter (55); an input register (58) connected to the traffic distributor (6); a buffer memory (65) addressed by the local counter; two memories (80, 81) each storing one half-byte and with their inputs connected to the buffer memory (65); a first addressing circuit (85) for addressing the memories connected to the local counter (55), to the control interface and to a multiframe alignment detection circuit (100); first and second data registers (101, 102) each connected to one of said two memories and to the control interface; a status memory (106) having a second addressing circuit connected to the control interface and to the local counter (55); a multiframe alignment circuit (100) with its input connected to the output of the buffer memory (65) and to the output of the status memory (106) and with its output connected to the first memory addressing circuit, the output of the status memory (106) being connected to a status register (108), the status register connected to the control interface; a signal change of state circuit (104) with its input connected to the buffer memory (65) and to each of the two memories (80, 81); and a signalling circuit (105) with its input connected to the two memories (80, 81) and its output connected to the multiregisters; wherein an identification signal (MSM) is input to the first addressing circuit (85) of the two memories (80, 81), to the multiframe alignment circuit (100) and to the signal change of state circuit (104), the inverted identification signal ($\overline{MSM}$) being input to the addressing circuit (85), to the signalling circuit (105) and to the multiframe alignment detection circuit (100), the identification signal having the value 1 when the connection module is connected to an exchange and the value 0 when it is connected to a line concentrator.

4. A multiplex connection unit according to claim 1, wherein the signalling sender comprises:
a local counter (251),
a first input register (232) connected to the switching network (RCX),
a second input register (233) connected to the output of the signalling receiver (7),
third and fourth registers (243, 244) each connected to the first and second registers, two memories (265, 266) each storing one half-byte, with their inputs connected to the third and fourth registers and to the control interface, a circuit (275) for addressing the two memories, two output registers (280, 281) each connected to one of the two memories and to the control interface, a signalling register (290) connected to the two memories and to the traffic distributor (6), a signal change of the state circuit with its input connected to the local counter and to the two memories and its output connected to the control interface, and an address register (287) connected to the output of the addressing circuit (275) and to the control interface, wherein the addressing circuit (275) is connected to the local counter (251) and to the control interface, an identification signal (MSM) is input to the signal change of state circuit (282) and to the addressing circuit (275), and the inverted identification signal ($\overline{MSM}$) is input the addressing circuit, the identification signal having the value 1 when the connection module is connected to an exchange and the value 0 when it is connected to a line concentrator.

5. A multiplex connection unit according to claim 1, wherein the connection module comprises transcoders (4) and two identical subsystems (315, 316) each connected to the transcoders, to the switching network and to the control interface (1), each subsystem comprising:

one synchronising unit (5) for each transcoder (4), a traffic distributor (6) connected to the switching network and to the control interface, a signalling receiver (7) connected to the traffic distributor (6), to the control interface and to the multiregisters, and a signalling sender (8) connected to the traffic distributor (6), to the switching network and to the control interface.

6. A multiplex connection unit according to claim 3, wherein the signalling receiver comprises a multiframe alignment detection circuit comprising a first register (148) connected to the synchronising units and receiving a frame skip signal; a second register (149) connected to the synchronising units and receiving a frame repetition signal; a processor (120) with its input connected to the first and second registers and to the status memory (106) and its output connected to a third register (122), the output of the third register connected to a bus (b); a first unitary register (127) and a second unitary register (132), each with its input connected by logic gates to (a) the output of the status memory and to (b) a first decoder (133) connected to the processor output, the outputs of the first and second registers being connected to the bus (B), the bus (B) being connected to the input of the status memory; a second decoder (138) and a third decoder (137) enabled by the identification signal (MSM) and the inverted identification signal ($\overline{MSM}$), respectively the second and third decoders having their outputs connected by an OR gate (139) to the logic gates of the first and second unitary registers.

* * * * *